United States Patent
Cheng

[19]

[11] Patent Number: 6,142,678
[45] Date of Patent: Nov. 7, 2000

[54] OPTICAL COUPLING

[75] Inventor: Yihao Cheng, Kanata, Canada

[73] Assignee: JDS Uniphase Inc., Ottawa, Canada

[21] Appl. No.: 09/333,018

[22] Filed: Jun. 15, 1999

[51] Int. Cl.[7] .................................................. G02B 6/36
[52] U.S. Cl. .............................. 385/79; 385/31; 385/33; 385/34; 385/61; 385/74; 385/88
[58] Field of Search .................. 385/31, 33–34, 385/35, 53–61, 70–74, 79, 92–93, 88

[56] References Cited

U.S. PATENT DOCUMENTS

| | | | |
|---|---|---|---|
| 4,281,891 | 8/1981 | Shinohara et al. | 385/88 |
| 4,573,760 | 3/1986 | Fan et al. | 350/96.21 |
| 4,714,315 | 12/1987 | Krause | 350/96.2 |
| 5,127,074 | 6/1992 | Watanabe et al. | 385/93 |
| 5,216,737 | 6/1993 | Driessen et al. | 385/93 |
| 5,734,768 | 3/1998 | Kim et al. | 385/52 |

*Primary Examiner*—Rodney Bovernick
*Assistant Examiner*—Ellen E. Kim
*Attorney, Agent, or Firm*—Neil Teitelbaum

[57] ABSTRACT

The present invention relates to an optical coupling between an end of an optical fiber and an end of a lens, which provides a reliable joint with a determined spacing and angular orientation. The optical coupling permits movement of the end of the optical fiber relative to the lens in at least two alignment directions. Advantageously, the present invention permits movement of the end of the optical fiber relative to the end of the lens in a direction perpendicular to the optical axis of the lens, before the optical coupling is secured. The optical fibre within an optical fiber tube/ferrule and the lens are secured within separate sleeves and the sleeves bonded together. The end of the optical fiber and the end of the lens are optically aligned before being secured in place relative to each other.

3 Claims, 5 Drawing Sheets

OPTICAL COUPLING

FIELD OF THE INVENTION

The present invention relates to an optical coupling system, particularly a connection system providing a reliable joint between optical elements. In particular, the present invention provides an optical coupling between an optical fibre and a lens.

BACKGROUND OF THE INVENTION

The most common optical connection used in manufacturing of optical devices is between an optical fibre end and a lens, such as a graded index (GRIN) lens. There are commonly two ways to make the connection. One common coupling system comprises a sleeve in which a fibre end within a supporting housing/ferrule is joined to a lens by attaching the sides of the ferrule and the lens to the interior bore of the sleeve. Manufacturing tolerances of, for instance, the lens diameter, the ferrule diameter, or the dimension and position of the bore within the ferrule, introduce variations which make it difficult to achieve accurate alignment using this type of connection. The sleeve must have a large enough internal dimension to accommodate a ferrule or lens at its largest tolerance. As a result, smaller elements may unintentionally become misaligned with respect to other components within the sleeve. The fibre end within the ferrule is not always concentric. When the ferrule internal diameter is too large for the fibre, the ferrule bore is not perfectly centred, or the fibre core is slightly off-centre, it becomes necessary to adjust, or tune, the alignment of the fibre to the lens. This is difficult within the confines of the prior art coupling sleeve. Temperature changes in the environment also cause different elements in the sleeve coupler to respond differently, further affecting the quality of the coupling. In many instances, it is preferred to have the fibre aligned at a port on the lens that is disposed adjacent to, rather than aligned with, the optical axis of the lens. This is not straightforward within a sleeve connection.

Another common practice is to couple an optical fibre to a lens, such as a graded index (GRIN) lens, by placing the optical fibre into a ferrule or fibre housing and joining an end face of the ferrule directly to a face of the lens by applying a layer of adhesive between them. A direct ferrule to lens adhesive connection facilitates alignment of the coupled elements and provides a uniform joint. Planar end faces of the lens and ferrule are reliably achieved to prevent unwanted tilt angle at the coupling. Positioning the fibre adjacent to the optical axis of the lens is possible without the confining sleeve coupler. Also, relatively easy alignment tuning is possible to compensate for eccentric fibre positioning within the ferrule. However, this method can only be used for lenses having flat surfaces which limits the applications of the method. Further, spacing between fibre and lens has to be accurately controlled which requires tight tolerance on the lens design.

To couple an optical fibre end to an optical element, such as a lens, several positioning variables exist: the spacing between the elements and the coupling point relative to the optical axis are two of them. Common coupling techniques do not provide a convenient method of adjusting the spacing between the elements and the coupling point at the same time.

It is often desired to make a coupling with a precise predetermined distance between elements, which is not practicable with a direct adhesive connection. Fixing the elements with the desired separation between them is typically accomplished by securing them on a substrate with adhesive. However, it is difficult to establish an exact separation and alignment by this method.

The use of a single sleeve into which the ends of the optical fibre and lens are placed only allows adjustment during tuning/alignment along a single axis, i.e., along the optical axis of the lens and the longitudinal axis of the ferrule. It would be advantageous to be able to provide additional directions for adjustment during tuning/alignment of an optical coupling.

It is desired to provide a coupling system, which provides a reliable means for coupling between optical elements. It is also desired to provide a coupling system, which can accurately control the spacing between optical elements, and provide adjustment to the alignment of the coupled optical elements.

SUMMARY OF THE INVENTION

The present invention provides a spaced apart optical coupling for accurately coupling between an optical fibre and a lens. The optical coupling comprising an end of the optical fibre and an end of the lens housed respectively within separate sleeves. In addition, the present invention provides opportunity for tuning/alignment in more than one direction before securing individual optical components and provides a reliable uniform joint.

Accordingly, the present invention provides an optical coupling comprising: an optical fibre housing having a longitudinal axis for accommodating at least one optical fibre; a lens having an optical axis, the lens for directing a beam of light into the at least one optical fibre and/or for receiving a beam of light from the at least one optical fibre, a first sleeve for accommodating the optical fibre housing; a second sleeve for accommodating the lens, the first and second sleeve having complementary end faces that allow relative movement with respect to the optical axis of the lens and the longitudinal axis of the optical fibre housing when inserted into their respective sleeves so that by adjusting the relative position of the two sleeves a preferred coupling is achieved. Preferably, the coupling is secured by forming an uniform joint between the two complementary faces.

Accordingly, the present invention further provides an optical coupling comprising: an optical fibre housing having a longitudinal axis for accommodating at least one optical fibre; a lens having an optical axis, the lens for directing a beam of light into the at least one optical fibre and/or for receiving a beam of light from the at least one optical fibre, a sleeve for accommodating the lens, wherein at least a portion of the optical fibre housing and the sleeve have complementary end faces that allow movement with respect to the optical axis of the lens and the longitudinal axis of the optical fibre housing when the lens is inserted into its sleeve so that by adjusting the relative position of the sleeve and the optical fibre housing a preferred coupling is achieved. Preferably, the coupling is secured by forming an uniform joint between the two complementary faces.

The present invention extends to a method of coupling an optical fibre end supported in an optical fibre housing to a lens comprising the steps of: disposing the optical fibre end supported in the optical fibre housing within a first sleeve; disposing the lens within a second sleeve, the first and second sleeve having complementary end faces abutting ends of the first sleeve and the second sleeve; aligning positions of the optical fibre end and the lens relative to one another, whilst maintaining an epoxy free gap; securing the optical fibre housing and the lens into their sleeves and securing positions of the first sleeve, the second sleeve by forming an uniform joint between the two complementary faces, such that they are immovable.

Advantages will be apparent to those skilled in the art with reference to the detailed description of preferred embodiments and the accompanying drawings, which illustrate preferred embodiments of the invention by example only.

BRIEF DESCRIPTION OF FIGURES

An embodiment of the invention will now be described in conjunction with the attached drawings in which like reference numerals designate like items.

DETAILED DESCRIPTION OF FIGURES

An optical coupling is provided which preferably uses two sleeves with complimentary end faces to provide an optical coupling between an optical fibre and a lens that are distant from one another. The coupling as described herein negates a need to have adhesive within the optical path and provides substantial flexibility for optical alignment of the optical fibre and the lens and also provides a reliable and stable joint.

Figure 1:
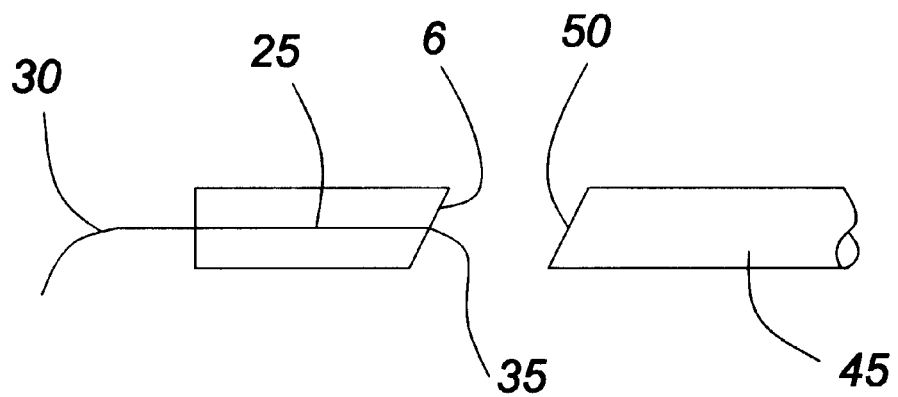
FIG. 1 is a cross-sectional side view of a single optical fibre held within an optical fibre housing in the form of an optical fibre tube. The single optical fibre and the optical fibre tube terminate in a flush slanted polished end face. A lens is also shown terminating in a slanted polished end face.

Referring to FIG. 1, shown is a cross-sectional side view of known components to be optically coupled, namely an optical fibre 30 and a lens 45. The lens 45 is for directing a beam of light into the optical fibre and/or for receiving a beam of light from the optical fibre 30. The optical fibre 30 is held within an optical fibre tube/ferrule 25, which is supporting the optical fibre 30 and secured thereto. The optical fibre tube 25 has an end 6 and the optical fibre 30 has an end 35. The ends are polished flush. The ends 35 and 50 are polished to the same complementary non-perpendicular angles. For simplicity a single fibre 30 is shown. In operation, when the optical fibre 30 and the lens 45 are aligned, light propagates through the fibre and propagates from the end of the fibre as a point light source. Light propagating from the end 35 of the optical fibre 30 enters and is collimated by the lens 45.

Figure 2:
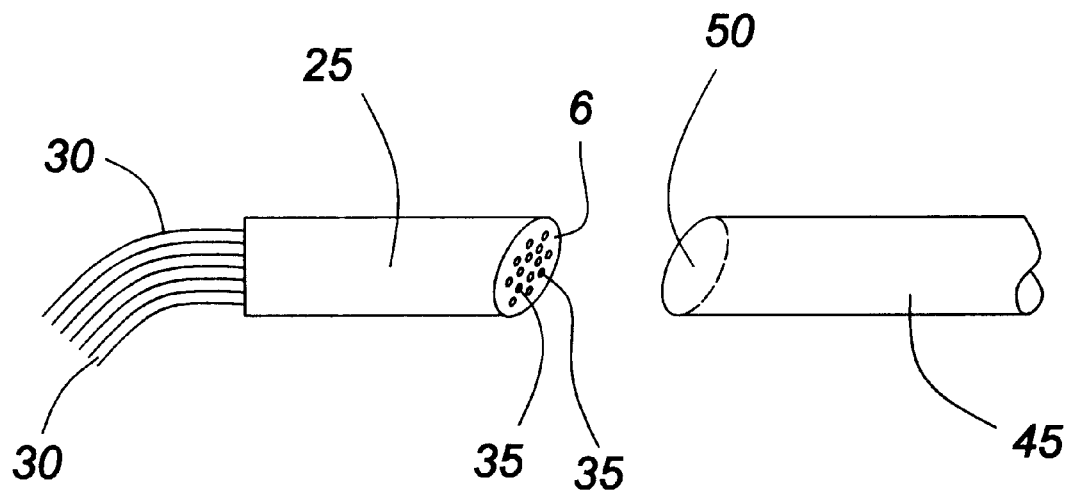
FIG. 2 is a perspective side view of a lens and a plurality of optical fibres held within an optical fibre tube. The plurality of optical fibres and the optical fibre tube terminate in a flush slanted polished end face and the lens terminates in a complimentary slanted polished end face.

Referring to FIG. 2, shown are a lens 45 and a plurality of optical fibres 30 supported and held within a fibre tube 25, that are known. The end 6 of the fibre tube 25 is shown in perspective having a plurality of optical fibre end faces 35. The end 50 of the lens 45 is shown in phantom. In operation, when the optical fibres 30 and the lens 45 are aligned, light propagates through the fibres and from the end face of the optical fibres 30 as point light sources. Light propagating from the end faces 35 of the optical fibres 30 enters and is collimated by the lens 45.

Figure 3A:
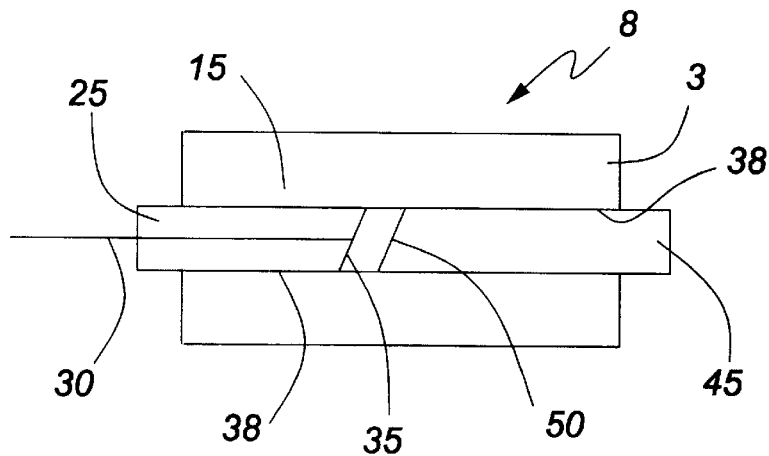
In FIG. 3(a) fibre tube and lens are secured to side walls of the sleeve and in FIG. 3(b) a space between the end faces of the optical fibres and the lens is filled with adhesive.

Referring to FIG. 3(a), shown is a prior art single sleeve coupling 8 in which a single sleeve 3 houses a fibre 30 supported and held within a fibre tube 25 and optically coupled to a lens 45. As is evident from FIG. 3(a) the single sleeve 3 allows little variation in geometrical constraints before securing the fibre tube 25 and the lens 45 in place. Prior to securing it is possible to: a) rotationally align the fibre tube and lens; and b) vary the distance between end faces 35 and 50 of the optical fibre 30 and the lens 45, respectively. However, in terms of desired geometric manipulations the two possible geometric manipulations are not sufficient. It would be advantageous to be able to align the optical fibre 30 and the lens 45 in a direction perpendicular to the optical axis of the lens 45. The prior art single sleeve optical coupling 8 shown in FIG. 3 prevents manipulations to align the optical fibre 30 and the lens 45 in a direction perpendicular to the optical axis of the lens 45.

Figure 3B:
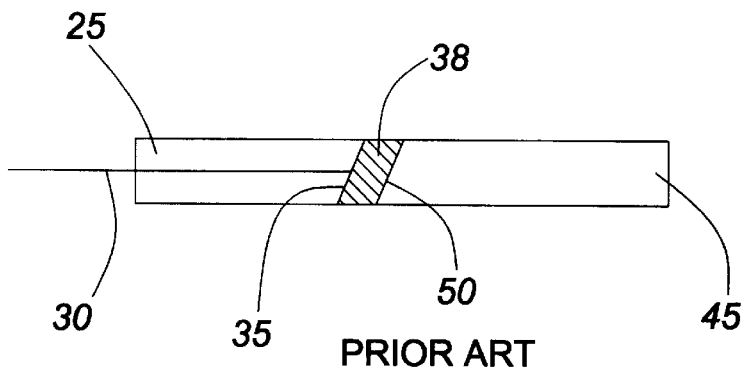
FIG. 3 is a cross-sectional side view of prior arts single sleeve optical coupling holding optical fibres within an optical fibre tube and a lens having slanted polished end face.

FIG. 3(b) shows another prior art coupling method where the fibre tube 25 and lens 45 are secured to each other by an epoxy 38. In this method relative position of the tube and lens can be adjusted in direction perpendicular to the optical axis of the lens 45, but the epoxy thickness is difficult to control due to tolerances in lens dimensions which could cause unstability.

Figure 4:
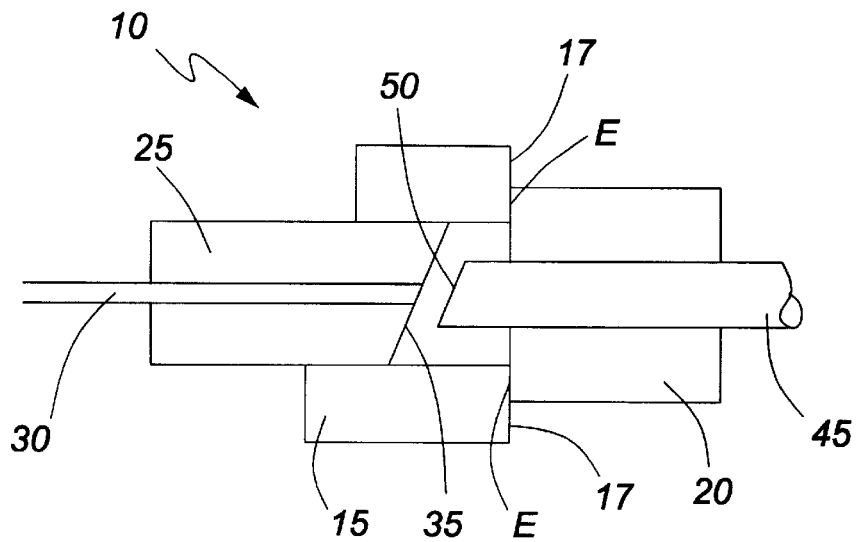
FIG. 4 is a cross-sectional side view of the optical coupling of the present invention. A plurality of optical fibres are held within an optical fibre tube. The plurality optical fibres and the optical fibre tube terminate in a flush slanted polished end face. A lens is also shown terminating in a slanted polished end face. The polished slanted end faces are held within respective sleeves that are abutting and secured in place by a uniform joint between end faces of the sleeves.

In contrast to the prior art coupling discussed above, the present invention allows the optical fibres 30 and the lens 45 to be aligned by movement perpendicular to the optical axis of the lens while also providing a uniform joint between the components. Heretofore, this has been desirable. Referring to FIG. 4, shown is an optical coupling 10 of the present invention. A first sleeve 15 and a second sleeve 20 have complementary abutting ends indicated by line 17. Positioned within the first sleeve 15 is an optical fibre tube/ ferrule 25 supporting and secured to an optical fibre 30, the optical fibre 30 having an end face 35. The end face 35 of the optical fibre 30 is flush with an end 40 of the optical fibre tube 25. The end face 35 of the optical fibre 30 and the end 40 of the optical fibre tube 25 are polished such that they are non-perpendicular to the longitudinal axis defined by the optical fibre tube 25. That is to say, the end face 35 of the optical fibre is slanted. Positioned within the second sleeve 20 is a lens 45, for example a GRIN lens. The lens 45 also has a slanted end face 50 complementary to the slanted end face 35 of the optical fibre 30. The two end faces 35 and 50 are secured relative to one another whilst maintaining a gap between them. Instead of joining the two end faces with an epoxy as practised in the art, the optical fibre tube 25 is secured to the first sleeve 15 and the lens 45 is secured to the second sleeve 20, and the two sleeves are secured to each other. An anti-reflective coating applied to the end faces of the elements minimizes reflection resulting from refractive index changes of the resulting gap between optical elements Referring again to FIG. 4, the optical coupling 10 is secured by applying a surface securing means, for example an epoxy, to the complementary abutting end faces 17 and internal surfaces of the sleeves. The joint so formed is substantially uniform in nature. The surface securing means is not limited to adhesive. Adhesive for securing optical components are understood to include: epoxy; metal solder; glass solder; liquid glass; glue; etc. Alternatively, optical elements may be provided, for instance, with a metal coating for soldering to sleeves. Of course, any method selected should result in a somewhat uniform joint. A method of forming the optical coupling 10 is to first secure the lens 45 within the second sleeve 20 such that the end of the rod with end face 50 lens protrudes from the second sleeve 20. Alternatively, the end face 50 does not protrude from the second sleeve 20 and is instead inset a distance relative to the fibre tube 25 in order to result in a desired gap. Position the first sleeve 15 in an abutting position against the second sleeve 20 as shown in FIG. 4 with the optical fibre tube 25 in place. Alternatively the optical fibre tube 25 is inserted after positioning the first sleeve 15 in the abutting position. Rotationally align the optical fibre 30 and the lens 45 such that the end faces 35 of the optical fibres 30 and the end face 50 of the lens 45 are complementary to each other. Tuning the optical coupling between the optical fibre 30 and the lens 45 is now possible in three directions that are substantially orthogonal to each other. The first direction is provided by moving the optical fibre tube 25 in a direction along the longitudinal axis of the optical fibre tube 25. In this manner, the two end faces 35 and 50 are moved towards each other or away from each other. The second and third directions are adjusted by sliding the abutting ends 17 against one another such that the two end faces 35 and 50 are moved relative to each other in directions perpendicular to the longitudinal axis of the fibre tube 25. In this manner, tuning of the optical coupling is accomplished without obstructing or hindering the quality of the optical transmission. Of course, when a gap between the optical elements is of a known distance, the optical fibre tube 25 is fixed within the first sleeve 15 and tuning along its longitudinal axis is not performed. Alternatively, when a gap of any small size is desired between the optical elements, the optical fibre tube 25 is fixed within the first sleeve 15 and tuning along its longitudinal axis is not performed.

The lens 45 as shown in FIG. 4 protrudes into the first sleeve and restricts movement in the direction perpendicular to the longitudinal axis of the fibre tube 25, i.e., horizontal axis. In this embodiment, the fibre tube 25 is of a larger diameter than the lens 45. As will be evident to one skilled in the art, it is possible to manufacture components of differing sizes according to requirements. The order of aligning optical components is not at the essence of the invention. It is possible to align by initially sliding the abutting ends 17 against one another and then moving at least one of the end faces 35 and 50 along the longitudinal axis of the optical fibre tube 25. Alternatively, the process of alignment is an iterative sequential process. It is within the scope of the present invention for the lens 45 and the fibre tube 25 to each be secured in a predetermined fashion within their respective sleeve and the end faces then aligned by movement of the sleeves orthogonal to the longitudinal axis of the fibre tube 25. As is now apparent, the present invention provides advantages over the prior art single sleeve optical coupling 8 exemplified in FIG. 3. An opportunity for tuning/alignment in more than one orthogonal direction is an advantage provided by the present invention.

Figure 5:
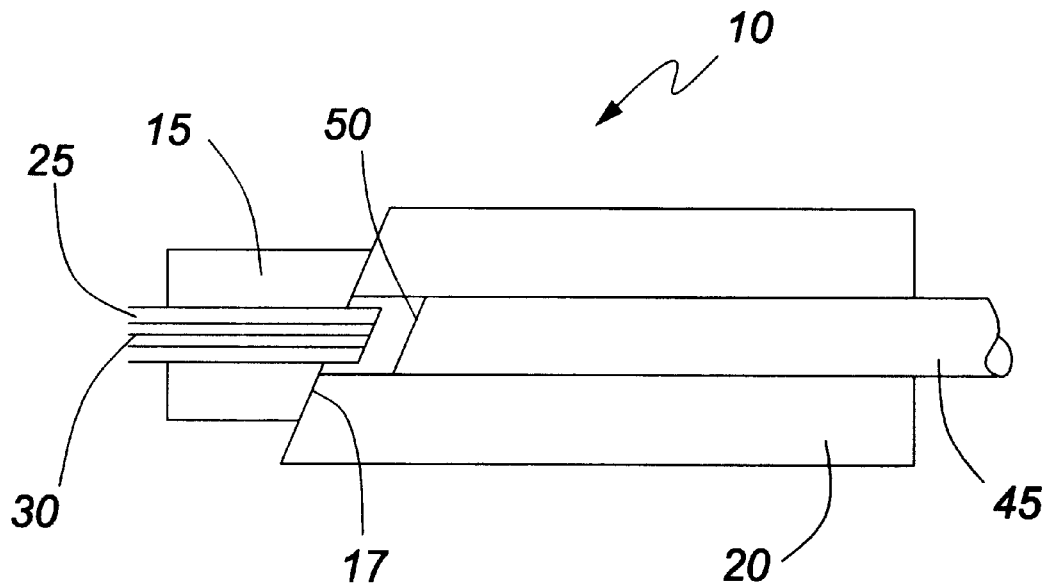
FIG. 5 is a cross-sectional side view of the optical coupling of the present invention substantially similar to that of FIG. 4 except that instead of the lens protruding from its sleeve, the plurality of optical fibres held within the optical fibre tube protrude from its sleeve.

Referring to FIG. 5, shown is an embodiment in which the optical fibre tube 25 protrudes into the second sleeve 17. In this embodiment, the fibre tube 25 is of a smaller diameter than the lens 45. In a similar manner to the optical coupling of FIG. 4, before securing the sleeves together, a limited movement in the direction perpendicular to the longitudinal axis of the fibre tube 25 is provided.

Figure 6:
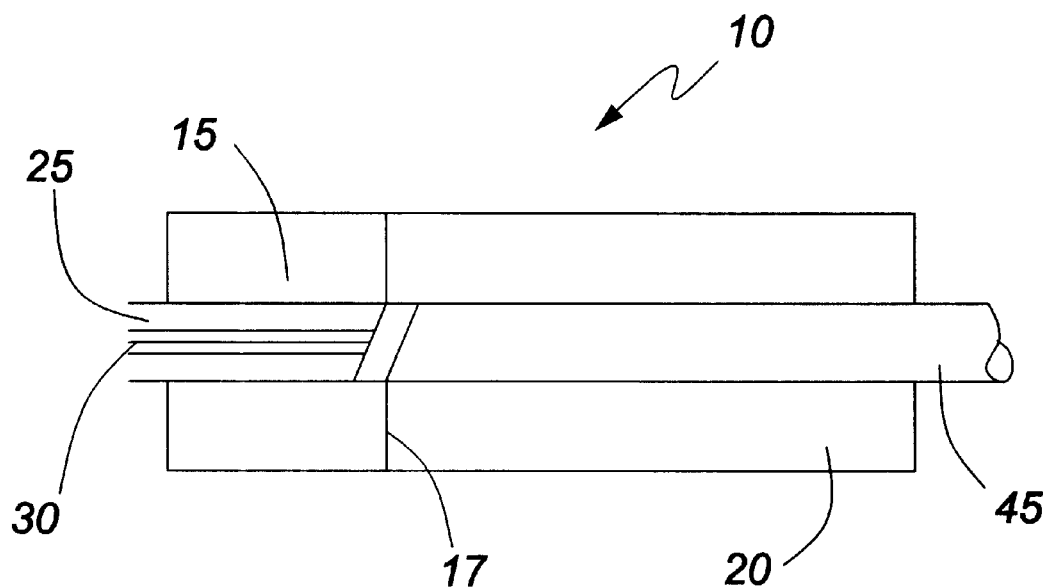
FIG. 6 is a cross-sectional side view of the optical coupling of the present invention substantially similar to that of FIG. 4 except that respective end faces of the plurality of optical fibres and the lens do not protrude outside their respective sleeves.

Referring to FIG. 6, shown is another embodiment. It is possible according to the invention for the end face 35 of the optical fibre 30 and the lens to be aligned without limiting movement in a direction perpendicular to the longitudinal axis of the fibre tube 25.

Figure 7:
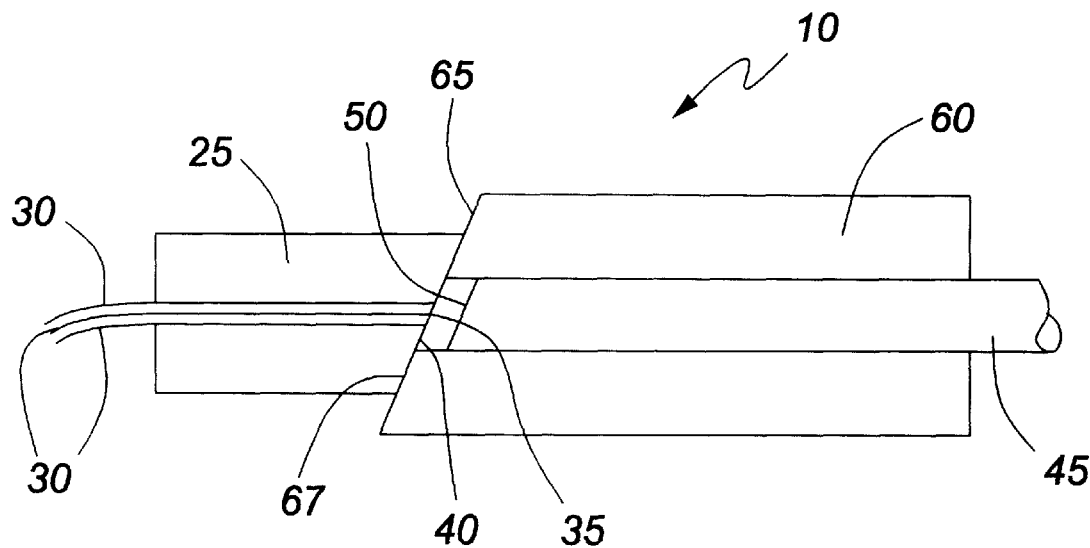
FIG. 7 is a cross-sectional side view of a single sleeve optical coupling of the present invention. A plurality of optical fibres are shown held within a single sleeve. A lens is shown within a sleeve. The plurality of optical fibres and the single sleeve terminate in a flush slanted polished end face and the lens terminates in a slanted polished end face. The slanted end faces are shown complementary one to another.

Alternatively, a single sleeve provides for an optical coupling 10. Referring to FIG. 7, a single sleeve 60 is used to optically couple the lens 45 to the optical fibre 30. The single sleeve 60 has an end 65 slanted at substantially the same angle as the optical fibre tube 25. The lens 45 is of a smaller diameter than the optical fibre tube 25, and is positioned within the single sleeve 60. The single sleeve 60 and the optical fibre tube 25 have complementary abutting ends indicated by line 67. The end 40 of the optical fibre tube is secured to the end face 65 of the single sleeve. When the optical fibre tube 25 and the single sleeve 60 are rotationally aligned a linear coupling is provided. It is now possible to tune the optical coupling between the optical fibre 30 and the lens 45 in three fashions. Moving the lens 45 along the optical axis within the single sleeve 60 provides for a first direction of tuning. In this manner, the two end faces 35 and 50 are moved towards each other or away from each other along the longitudinal axis of the optical fibre tube 25, whilst maintaining an air gap between the two end faces 35 and 50. One skilled on the art will understand that the term "air gap" extends to other gasses or mixtures thereof, for example nitrogen, neon, etc. By sliding the abutting ends 67 against each other thereby moving the two end faces 35 and 65 relative to each other in a direction perpendicular to the longitudinal axis of the fibre tube 25, tuning is also achieved. Therefore, in a similar manner to that described in FIG. 4, tuning of the optical coupling is accomplished before securing the optical fibre 35 and the lens 45 relative to each other. The end 40 of the optical fibre tube 25 and the end 65 of the single sleeve 60 are bonded together, as are the lens 45 and the single sleeve 60. Of course, when an embodiment such as that of FIG. 7 is used, tuning of an angular orientation between the lens 45 and the fibre tube 25 is supported. Rotation of the sleeve, because of its slanted end face, varies an angle between the optical axes of the optical components.

Figure 8:
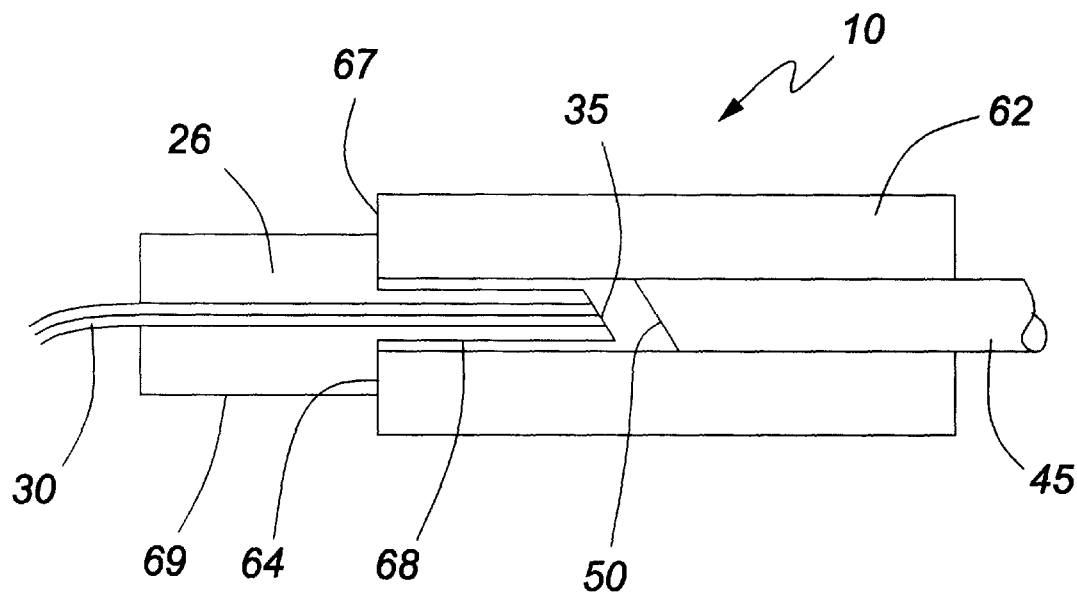
FIG. 8 is cross-sectional side view of another optical coupling of the present invention. A plurality of optical fibres are held within an optical fibre tube. The plurality of optical fibres and the optical fibre tube terminate in a slanted flush polished end face and the lens terminates in a slanted polished end face. The optical fibre tube has a step portion, which abuts against a complementary end of the complimentary sleeve.

Referring to FIG. 8, shown is another embodiment of a single sleeve 62 optical coupling 10. The single sleeve 62 has a flat end 67 substantially perpendicular to the optical axis of a lens 45. A fibre tube 26 has two sections of differing diameters. A first section 68 of a smaller diameter than the lens 45 and a second section 69 of a larger diameter than the lens 45. The lens fits into the single sleeve 62 as well as the first section 68. A step portion 64 defining a boundary between the first section 68 and the second section 69 abuts against the end 67 of the sleeve. The step portion 64 is flat and substantially perpendicular to the longitudinal axis of the fibre tube 26. As illustrated, the first section 68 and the second section 69 are concentric, however this is not essential. Before securing the optical coupling 10, the step portion 64 and the end 67 of the sleeve 62, which are complementary and abutting, permit movement perpendicular to the optical axis of the lens. The first section 68 is of small enough diameter to allow movement within the sleeve but also serves to provide a stop by limiting movement perpendicular to the optical axis of the lens. The process of alignment of the optical coupling 10 is similar to that described above.

Figure 9:
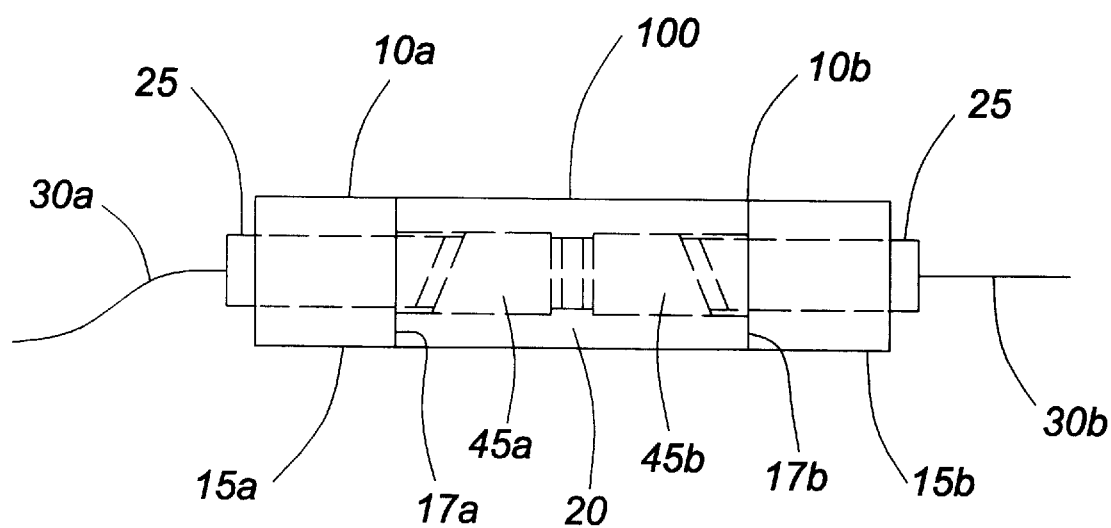
FIG. 9 is an illustration of optical couplings of the present invention providing an input port to an optical device and an output port from the optical device.

Referring to FIG. 9, the optical couplings 10*a* and 10*b* of the present invention are shown providing an input port and an output port to a device 100. The device 100 is not at the essence of the invention and is, for example, an isolator, circulator or a filter etc. In operation, a light signal is fed through an optical fibre 30*a*, which is directed into a lens 45*a* by geometrical constraints imposed by the optical coupling 10*a* as detailed above. The lens routes the light signal into the device 100. A light signal emerging from the device 100 emerges via another lens 45*b*, which is directed into an optical fibre 30*b*.

Though the above description refers to GRIN lenses, it is also possible to use other lenses in accordance with the invention. For example, the use of conventional lenses such as aspheric lens, spheric lens etc. A hermetic sealed coupling is also achievable using the present invention by forming an hermetic joint between the complementary end faces of the sleeves and between the fibre housing and the sleeve at one end and the lens and the sleeve at the other end. For example, a fibre is inserted into a fibre tube and joined thereto hermetically using solder. The fibre tube and the sleeve are also coupled using an hermetic solder seal. When the sleeves are coupled using an hermetic joint, a hermetic seal results at one end of the joint. This is sufficient for sealing a single end of the device. When necessary, the other end of the coupling is also hermetically sealed.

Though the preceding disclosure refers to a joint that is somewhat uniform and more preferably substantially uniform, the uniform nature of the joint is only one of many advantages of the present invention. Of course it is preferred. A similar coupling absent a uniform joint between sleeves, though not preferred, is also useful and advantageous.

The preceding examples are for illustration only, and are not intended to be limiting. Numerous other embodiments will be apparent to one skilled the art, without departing from the spirit and scope of the invention as defined in the appended claims.

What is claimed is:

1. An optical coupling comprising an optical fibre housing for accommodating at least one optical fibre;

a lens for directing a beam of light into the at least one optical fibre and/or for receiving a beam of light from the at least one optical fibre;

a first sleeve for accommodating the optical fibre housing;

a second sleeve for accommodating the lens, the first and second sleeve having complementary end faces that when contacting one another allow relative lateral movement with respect to the optical axis of the lens and the longitudinal axis of the optical fibre housing when inserted into their respective sleeves so that by laterally adjusting the relative position of the two sleeves a preferred coupling is achievable prior to the sleeves being affixed together, the end face of the lens nearest the optical fibre housing and the end face of the optical fibre being spaced from one another while the complementary end faces are touching; and, two complementary end faces of the sleeves having adhesive therebetween joining the two end faces, wherein the first sleeve and the second sleeve comprise mating portions, the mating portions permitting restricted relative movement of the sleeves in the plane orthogonal to their longitudinal axes.

2. An optical coupling comprising:

an optical fibre housing for accommodating at least one optical fibre;

a lens for directing a beam of light into the at least one optical fibre and/or for receiving a beam of light from the at least one optical fibre, a sleeve for accommodating the lens, at least a portion of the optical fibre housing and the sleeve having complementary ends allowing relative movement with respect to the optical axis of the lens and the longitudinal axis of the optical fibre housing when the lens is inserted into its sleeve, the end face of the lens nearest the optical fibre housing and the end face of the at least one optical fibre being spaced from one another while the complementary ends are touching; and, an adhesive disposed on and between the two complementary end faces for securing the end faces relative to each other wherein the sleeve and the optical fibre housing comprise mating portions, the mating portions permitting restricted relative movement of the sleeve and the optical fibre housing in the plane orthogonal to their longitudinal axes.

3. An optical coupling as defined in claim 2, wherein a portion of the optical fibre housing protrudes into the sleeve.

* * * * *